Figure 1:
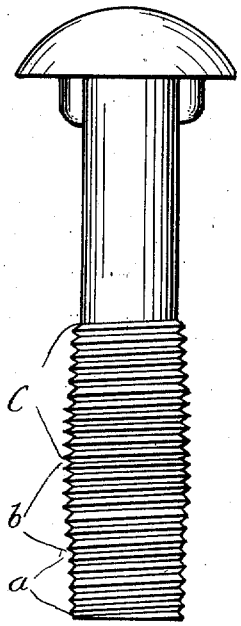

C. RYAN.
SELF LOCKING BOLT.
APPLICATION FILED DEC. 18, 1911.

1,064,546. Patented June 10, 1913.

Witnesses:
Theo. Lagaard
H. A. Bowman

Inventor:
Catherine Ryan.
By F. A. Whiteley
her Attorney

UNITED STATES PATENT OFFICE.

CATHERINE RYAN, OF ST. PAUL, MINNESOTA.

SELF-LOCKING BOLT.

1,064,546.   Specification of Letters Patent.   Patented June 10, 1913.

Application filed December 18, 1911. Serial No. 666,567.

*To all whom it may concern:*

Be it known that I, CATHERINE RYAN, a citizen of the United States, residing at St. Paul, in the county of Ramsey and State of Minnesota, have invented certain new and useful Improvements in Self-Locking Bolts, of which the following is a specification.

My invention relates to a bolt so constructed that when the nut is screwed thereon the bolt is in effect self-locking. This bolt is more especially adapted to be used as a railroad bolt for securing the ends of the rails in position by means of fish plates, but may be used to advantage in bolts designed for other purposes.

It is the object of my invention to provide a bolt of the above character which will coöperate with the ordinary closed nut or the split nut, as desired, and the locking feature of which is provided by means of the form of thread upon the threaded end of the bolt. A portion of this thread will be such as to permit the application of the nut to the bolt under more or less high stress, requiring a large amount of force to turn the nut over these threads, after which the threads will be of such form that the force required to turn the nut will be lessened so that when the nut is drawn firmly into place the form and relation of the threads will be such as to tend to cause the bolt continually to tighten and thus have the effect of locking the nut in position by means of the wedging action of the first set of threads over which the nut has been turned to bring it into position. I accomplish these results by providing on the end of the bolt, after the usual low threads at the beginning for starting the nut on the bolt, a series of threads of substantially the same depth and so related in depth and pitch to the threads of the nut that the same may be screwed on and over said threads, but only with the exercise of a considerable degree of force. This first series of threads will then run into a thread or series of threads equally spaced but progressively deepening for a predetermined distance. When the nut passes from the first series of threads to the deepening threads it will continually turn more easily until it reaches final position. The first series of threads will be positioned so that the nut will have just passed beyond them and be positioned or threaded into the progressively deepening threads, the effect of which will be to wedge the nut in its operative position so that jar and shock due to trains running over the rails or to the process of operation of the devices on which the bolt is secured will constantly tend to turn the nut so as to hold the same in fixed engagement.

Figure 2:
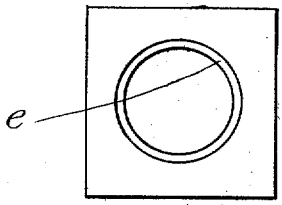
Figure 3:
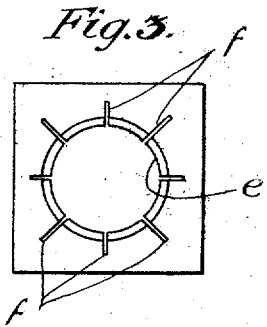

In the drawings illustrating my invention,—Figure 1, illustrates a bolt embodying my invention in slightly different forms. Figs. 2 and 3 show the ordinary closed nut and a special form of slotted closed nut either of which may be advantageously used in connection with my bolt.

In the form of bolt shown in Fig. 1 the series of threads $a$ gradually increases in depth into a short series of quite deep threads $d$ followed by a series of threads $b$ which grow progressively more shallow, the bases of all of said threads being in a line bent opposite the deeper threads somewhat toward, or if desired in a line substantially parallel with the axis of the bolt. This arrangement will have the same effect in locking the nut to the bolt as that described in relation to the forms shown in Figs. 1 and 2. That is, near the end of the bolt there are provided a series of threads the active limits of which extend slightly beyond the normal limits of the threads on the nut, followed by a series of threads on the bolt the active limits of which are progressively withdrawn from the normal active limits of the threads on the nut, so that as the nut is screwed on the bolt the threads thereof must be jammed over the bolt threads having their active limits at the maximum extent, and the succeeding bolt threads with active limits diminishing from said maximum will tend to move the nut when in position, if the same is moved at all, farther on rather than off of the bolt.

By the active limits of the bolt threads I mean the portions of the surfaces of the threads limiting the extent thereof which engage the walls of the nut threads and the bottoms of the grooves between said walls, and the converse proposition would be true of the normal limits of the threads of the nut. That is, in a nut and bolt threaded in the usual way the nut threads extend to a certain position between and engage the walls of the bolt threads and the bolt threads correspondingly extend to a certain distance between and engage the walls of the nut threads, this engagement being such that the nut can be turned with comparative ease upon the bolt. If the bolt threads are made relatively higher than the normal nut thread with which such bolt threads would so coöperate the active limits of the bolt thread would be extended beyond the normal limits of such a nut thread, and in order to screw the nut over such extended bolt threads it would be necessary that the substance of the bolt thread be slightly compressed in the groove of the nut thread. This would be equally true if the nut were formed with a thread either wider or longer than the bolt thread which would normally coöperate with the bolt thread, in which case the nut thread would have to be slightly compressed by or between the bolt threads. The bolt threads of the part $d$ will have the active limits thereof extended beyond the normal limits of such nut threads and force will be required to carry the nut over the threads $d$ resulting in compression of said threads within the grooves of the nut threads. In practice, and as shown, the nut threads will be the common ordinary threads cut for a bolt of the given size, the differences in the engaging characteristics of the bolt threads being formed on the bolt itself.

In the case of either of the nuts shown in Fig. 2 or Fig. 3 the threads $e$ thereof will be of such size as to wedge tightly in the threads $d$ of Fig. 1 so that relatively great force will be required to screw the nut over these threads. After the nut has started to pass into the threads of the series $b$, turning of the nut will become progressively easier so that when the face of the nut is brought into engagement with the fish plate or other member to be held by the bolt it can be turned tight without difficulty, and at the same time the fact that the active limits of the threads back of it progressively increase in extent up to the maximum will tend to wedge the nut against said fish plate or member. Rattling caused by the train passing over the rails or the jar or shock incident to the operation of any machine upon which the bolt may be used, if affecting the nut at all can only operate to tighten the same if such a thing were possible.

In some instances a closed nut, such as shown in Fig. 3 in which a series of radial slots $f$ are cut outwardly through the threads and toward the edge of the nut, may be used to advantage in permitting a certain amount of expansion on the nut as it passes over the series of threads $d$. I wish it to be understood, however, that my bolt will work under all ordinary conditions equally as well with a closed nut of common or usual construction.

My bolt can be formed by rolling or other common methods employed in the manufacture of such articles. It is cheap and efficient to the highest degree.

I claim:

In combination with a nut or bur, a bolt having threads near the end of substantially uniform depth and of a size normally to receive the nut, said threads thereafter progressively increasing in outer peripheral diameters up to a maximum and then progressively diminishing for a determined distance, the bottoms of said threads falling in a cylindrical surface concentric with the axis of the bolt, so that when the nut is screwed on so as to force the threads thereof over said threads of largest diameter, the nut will thereby be held wedged upon the bolt.

In testimony whereof I affix my signature in presence of two witnesses.

CATHERINE RYAN.

Witnesses:
F. A. WHITELEY,
H. A. BOWMAN.